(12) United States Patent
Thielert

(10) Patent No.: US 7,566,049 B2
(45) Date of Patent: Jul. 28, 2009

(54) COOLING DEVICE FOR COKE-OVEN GAS

(75) Inventor: Holger Thielert, Dortmund (DE)

(73) Assignee: Uhde GmbH, Dortmund (DE)

( * ) Notice: Subject to any disclaimer, the term of this patent is extended or adjusted under 35 U.S.C. 154(b) by 584 days.

(21) Appl. No.: 10/538,272

(22) PCT Filed: Aug. 2, 2003

(86) PCT No.: PCT/EP03/08580
§ 371 (c)(1),
(2), (4) Date: Jun. 28, 2006

(87) PCT Pub. No.: WO2004/053023
PCT Pub. Date: Jun. 24, 2004

(65) Prior Publication Data
US 2006/0249861 A1 Nov. 9, 2006

(30) Foreign Application Priority Data
Dec. 11, 2002 (DE) .................................. 10 58 066

(51) Int. Cl.
*B01F 3/04* (2006.01)
(52) U.S. Cl. .................. 261/153; 261/155; 261/156
(58) Field of Classification Search ................. 261/116, 261/117, 118, 152, 153, 155, 156
See application file for complete search history.

(56) References Cited

U.S. PATENT DOCUMENTS

| | | | | |
|---|---|---|---|---|
| 899,201 A | * | 6/1908 | Clark | .......................... 261/155 |
| 4,340,572 A | | 7/1982 | Ben-Shmuel et al. | |
| 4,614,229 A | * | 9/1986 | Oldweiler | .................... 165/115 |
| 5,468,426 A | * | 11/1995 | Kato | ........................... 261/153 |

FOREIGN PATENT DOCUMENTS

| | | |
|---|---|---|
| BE | 785 340 A | 10/1972 |
| DE | 10 28 579 B | 4/1958 |
| WO | WO 85 03339 A | 8/1985 |

OTHER PUBLICATIONS

International Search Report in English, Dec. 2004.

* cited by examiner

*Primary Examiner*—Scott Bushey
(74) *Attorney, Agent, or Firm*—Collard & Roe, P.C.

(57) ABSTRACT

The invention relates to a gas cooling device for coke-oven gas containing condensing constituents. Said device comprises a gas conduit (6), through which the coke-oven gas flows, heat exchanger elements in said gas conduit that are traversed by a coolant and a spray device (2) located above the heat exchanger elements, the surface of the heat exchanger elements that faces the gas being wet by a liquid that is fed through the spray device (2). According to the invention, the heat exchanger elements (5) are configured as cooling plates (5), through which the coolant can flow and are combined with channel-forming spacers (7) to form at least one heat exchanger stack. The heat exchanger stacks are located in the gas conduit (6) with a vertical alignment of their cooling plates (5), the gas channels formed by the spacers (7) being sprayed from above by the liquid that emanates from the spray device (2) and being traversed by the coke-oven gas.

4 Claims, 2 Drawing Sheets

US 7,566,049 B2

COOLING DEVICE FOR COKE-OVEN GAS

CROSS REFERENCE TO RELATED APPLICATIONS

Figure 1:
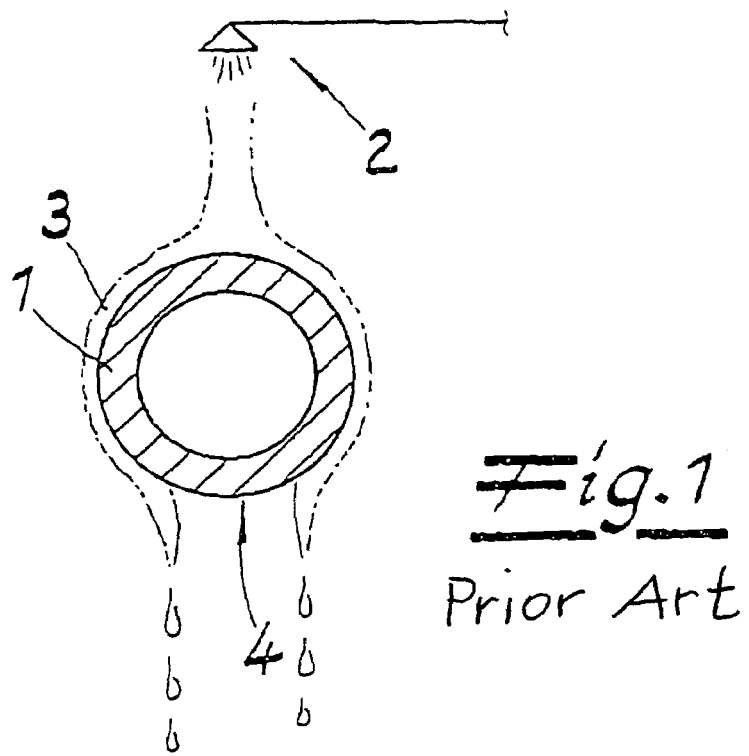

Applicant claims priority under 35 U.S.C. §119 of German Application No. 102 58 066.9 filed on Dec. 11, 2002. Applicant also claims priority under 35 U.S.C. §365 of PCT/EP2003/008580 filed on Aug. 2, 2003. The international application under PCT article 21(2) was not published in English.

The invention relates to a gas-cooling device for coke oven gas that contains condensing constituents, having
 a gas channel through which coke oven gas flows,
 heat exchanger elements through which a coolant flows, within the gas channel, and
 a sprinkling device above the heat exchanger elements, whereby the gas-side heat exchanger surface of the heat exchanger elements is wetted with fluid that is supplied by means of the sprinkling device.

According to the state of the art, transverse pipe gas cooling devices are used. In the operation of such cooling devices, the problem exists that constituents contained in the coke-oven gas, particularly tar or naphthalene, condense, deposit on the gas-side heat exchanger surfaces, and thereby worsen the heat transfer. To reduce gas-side deposits, the gas-side heat transfer surfaces of the transverse pipe gas-cooling device are sprinkled with water, so that a film of water forms on the surfaces, which transports the constituents condensed from the coke-oven gas away. However, the device described has several disadvantages. Sprinkling of the transverse pipes is not completely successful, since the film of water that forms on the gas-side heat transfer surface tears open in the lower region of the transverse pipes and the water drips off or flows off from there. As a result, there is no closed film of water present on the underside of the transverse pipes, which would allow deposit-free transport away of the constituents that have been separated. In operation, contamination is regularly observed on the underside of the transverse pipes. The required cleaning of the transverse pipes is complicated and results in a shut-down of the cooling device during the entire cleaning procedure. In case of severe contamination of the pipes, which cannot be removed by means of cleaning procedures, the pipes must be removed from the gas channel and replaced with new pipes, at great effort and expense. This results in high costs and is also connected with a long shut-down time of the cooling device.

The invention is based on the task of indicating a cooling device for coke-oven gas, having the characteristics described initially, which has only a slight tendency to become contaminated, allows quick cleaning, and in rare cases of contamination that cannot be removed by means of cleaning, allows a quick replacement of the heat exchanger elements.

According to the invention, this task is accomplished in that the heat exchanger elements are configured as cooling plates through which the coolant can flow, and which are brought together to form at least one heat exchanger package with channel-forming spacers, and that the heat exchanger package is disposed in the gas channel with a vertical orientation of the cooling plates, whereby the liquid that exits from the sprinkling device is applied to the gas channels formed by the spacers, and the coke-oven gas flows through these channels.

This solution has clear advantages as compared with the state of the art. Because of the advantageous geometry, sprinkling the cooling plates with water results in a closed film of water on the gas-side heat transfer surfaces, which does not tear open at the bottom end of the cooling plates and therefore wets the cooling plates completely. As a result, deposit of separated constituents on the heat exchanger surfaces is significantly reduced.

The heat exchanger package can be disposed in a vertical segment of the gas channel, so that the coke-oven gas flows through the heat exchanger package in the same current or counter-current to the film of liquid that runs down the heat exchanger surfaces.

Alternatively, the heat exchanger package can be disposed in a horizontal segment of the gas channel, so that the coke-oven gas flows through the heat exchanger package in a cross-current to the film of liquid that runs down the heat exchanger surfaces.

According to a preferred embodiment of the invention, the heat exchanger package can be inserted laterally into the gas channel, as a replacement unit. This results in additional noteworthy advantages. Cleaning of the heat exchanger package causes only little effort, since the package can be removed from the coke-oven gas-cooling device for cleaning and is then more easily accessible. It is also possible to replace the contaminated heat exchanger package with a non-contaminated heat exchanger package, and to insert it again only after cleaning has taken place, during the next required cleaning procedure. In this way, the duration of the shut-down of the coke-oven gas-cooling device caused by cleaning of the heat exchanger package is clearly reduced. Furthermore, in case of a severe contamination of the heat transfer surfaces, which occurs very rarely, for example due to a problem in the operation of the sprinkling device, which cannot be removed by cleaning procedures, it is possible to replace the heat exchanger package very easily, again at comparatively low costs and with the result of only a short shut-down time.

The sprinkling device is preferably installed in the gas channel in fixed manner.

Figure 2:
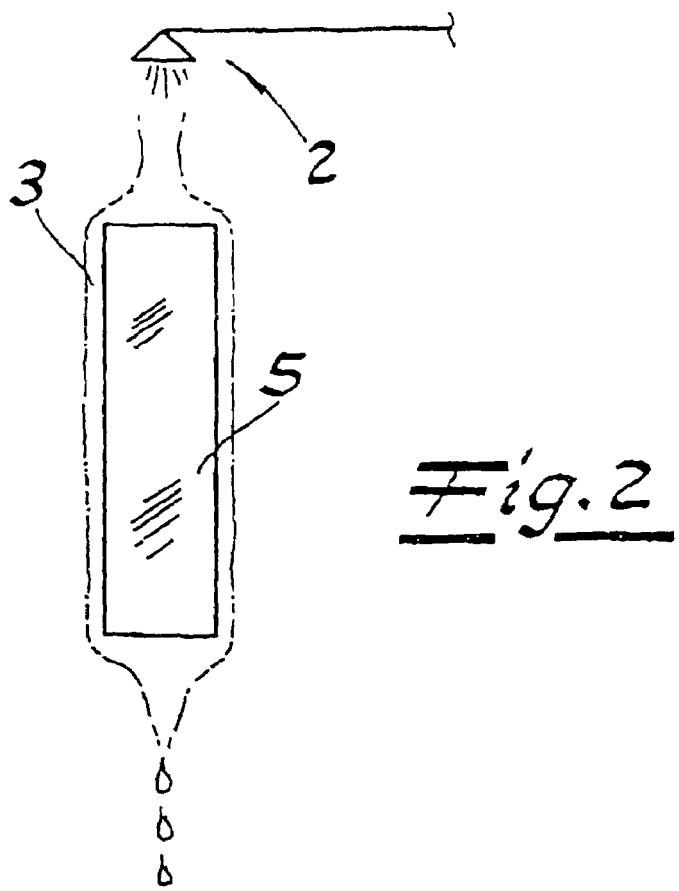
Figure 3:
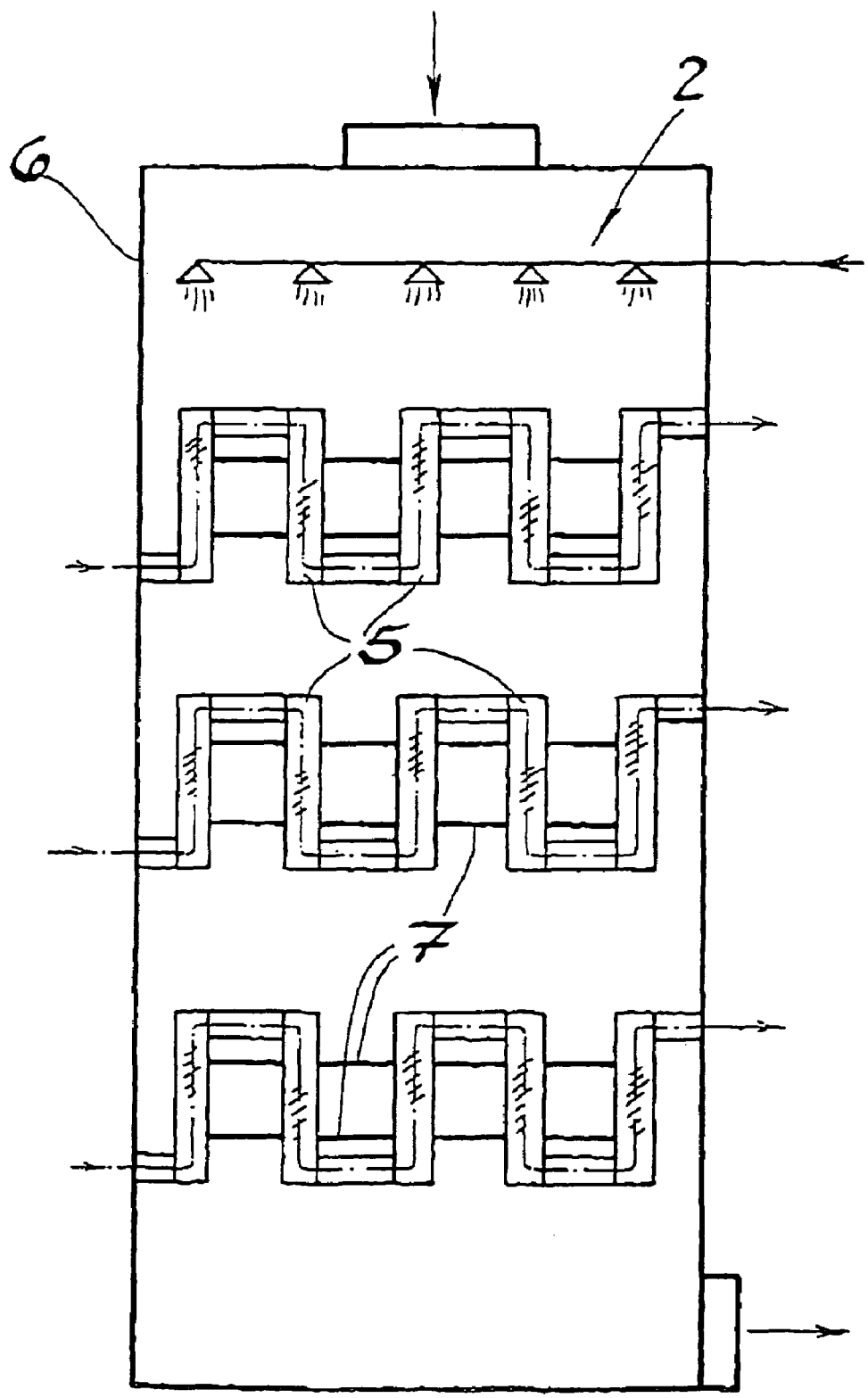

In the following, the invention will be explained in detail, using a drawing that represents an embodiment merely as an example. The drawing schematically shows:

FIG. 1 a cross-section through a transverse pipe of a transverse pipe gas cooling device that is used to cool coke-oven gas, according to the state of the art, FIG. 2 a detail of the coke-oven gas-cooling device according to the invention, FIG. 3 an overall representation of the coke-oven gas-cooling device according to the invention, with a multiple arrangement of the heat exchanger packages in a vertically oriented gas channel.

FIG. 1 shows a transverse pipe 1 of a transverse pipe gas-cooling device, through which a coolant flows; this device is used for cooling coke-oven gas according to the state of the art. Using a sprinkling device 2, the transverse pipe 1 is sprinkled with water, so that a film of water 3 that corresponds to the geometry of the transverse pipe 1 forms. This film tears open in the lower region of the transverse pipe 1 and therefore does not surround the transverse pipe 1 completely. The transverse pipe underside 4 is not wetted by the film of water 3, and therefore contamination of the transverse pipe 1 occurs there, due to the condensation of constituents contained in the coke-oven gas, particularly tar or naphthalene.

FIG. 2 shows a detail of the coke-oven gas-cooling device according to the invention, in which the heat exchanger elements are configured as cooling plates 5. The cooling plates 5 are oriented vertically and the coolant can flow through them. The film of water 3 that forms as a result of sprinkling by means of the sprinkling device 2 completely wets the gas-side heat exchanger surfaces, because of the advantageous plate geometry, so that the constituents separated from the coke-oven gas, e.g. by means of condensation, are transported away with the film of water 3, and do not contaminate the heat exchanger surfaces.

FIG. 3 shows the complete representation of the gas cooling device for coke-oven gas that contains condensing constituents, with a gas channel 6 though which coke-oven gas flows, heat exchanger elements within the gas channel 6, through which a coolant flows, and a sprinkling device 2 above the heat exchanger elements, whereby the gas-side heat exchanger surface of the heat exchanger elements is wetted with water that is supplied by the sprinkling device 2. According to the invention, the heat exchanger elements are configured as cooling plates 5, through which the coolant can flow and which are combined into at least one heat exchanger package with channel-forming spacers 7. The heat exchanger packages are disposed in the gas channel 6 with a vertical orientation of the cooling plates 5, whereby the water that exits from the sprinkling device 2 is applied to the gas channels formed by the spacers 7, and the coke-oven gas flows through these channels. The heat exchanger packages can be inserted laterally into the gas channel 6, as a replacement unit. In the example shown in FIG. 3, the gas channel 6 is oriented vertically.

The invention claimed is:

1. Gas cooling device for coke oven gas that contains condensing constituents, having
    a gas channel (6) through which coke oven gas flows, and
    cooling plates (5) through which a coolant flows, which are combined to form at least one heat exchanger package with channel-forming spacers (7),
whereby the heat exchanger package is disposed in the gas channel (6) with a vertical orientation of the cooling plates (5), and a sprinkling device (2) is provided above the heat exchanger package, wherein the coke-oven gas flows through the gas channels formed by the spacers (7), and that the liquid that exits from the sprinkling device (2) is applied to them,
    so that the gas-side heat-exchanger surface of the cooling plates (5) is wetted with liquid and a film of liquid forms on the heat-exchanger surface, which transports away constituents that condense out of the coke-oven gas, and
that the heat exchanger package can be inserted laterally into the gas channel (6), as a replacement unit.

2. Gas cooling device according to claim 1, wherein the heat exchanger package is disposed in a vertical segment of the gas channel (6), and that the coke-oven gas flows through the heat exchanger package in the same current or counter-current to the film of liquid that runs down the heat exchanger surfaces.

3. Gas cooling device according to claim 1, wherein the heat exchanger package is disposed in a horizontal segment of the gas channel (6), and that the coke-oven gas flows through the heat exchanger package in a cross-current to the film of liquid that runs down the heat exchanger surfaces.

4. Gas cooling device according to claim 1, wherein the sprinkling device (2) is installed in the gas channel (6) in fixed manner.

* * * * *

UNITED STATES PATENT AND TRADEMARK OFFICE
CERTIFICATE OF CORRECTION

PATENT NO. : 7,566,049 B2
APPLICATION NO. : 10/538272
DATED : July 28, 2009
INVENTOR(S) : Thielert It is certified that error appears in the above-identified patent and that said Letters Patent is hereby corrected as shown below:

In particular, on the Title page, item [30], please change "10 58 066" to correctly read: --102 58 066--.

Signed and Sealed this

Fifteenth Day of September, 2009

David J. Kappos
*Director of the United States Patent and Trademark Office*